(12) United States Patent
Young et al.

(10) Patent No.: US 6,195,528 B1
(45) Date of Patent: Feb. 27, 2001

(54) TEACHING METHOD AND SYSTEM

(75) Inventors: Kenneth D. Young; Murl J. Keidel, both of Fort Wayne, IN (US)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/206,533

(22) Filed: Dec. 7, 1998

Related U.S. Application Data

(60) Provisional application No. 60/069,142, filed on Dec. 9, 1997.

(51) Int. Cl.⁷ .............................. G09B 5/00; G09B 19/00
(52) U.S. Cl. ........................................ 434/307 R; 434/118
(58) Field of Search ................................ 434/118, 307 R; 380/3; 395/186, 187.01

(56) References Cited

U.S. PATENT DOCUMENTS

| | | |
|---|---|---|
| 5,241,625 | 8/1993 | Epard et al. . |
| 5,267,865 * | 12/1993 | Lee et al. ............................. 434/350 |
| 5,344,326 | 9/1994 | Ferris . |
| 5,484,293 | 1/1996 | Ford et al. . |
| 5,489,213 | 2/1996 | Makipaa . |
| 5,513,991 | 5/1996 | Reynolds et al. . |
| 5,677,953 * | 10/1997 | Dolphin ................................... 380/4 |
| 5,909,589 * | 6/1999 | Parker et al. ................... 395/800.32 |

FOREIGN PATENT DOCUMENTS

| | | | |
|---|---|---|---|
| 0 838 798 A1 | 10/1997 | (EP) | ............................ G09B/7/04 |
| 97/36233 * | 10/1997 | (WO) . | |
| WO 97/36233 | 10/1997 | (WO) | ............................ G06F/12/00 |
| WO 97/42615 | 11/1997 | (WO) | ............................ G09B/3/00 |

OTHER PUBLICATIONS

United States Statutory Invention Registration Registration No. H1452 Published Jun. 6, 1995 Inventor: Kennedy Filing Date Aug. 25, 1992.

* cited by examiner

*Primary Examiner*—John Edmund Rovnak
(74) *Attorney, Agent, or Firm*—Randall J. Knuth

(57) ABSTRACT

A teaching system apparatus and method for improving the ability of a student to learn with a connection to a remote computer. A plurality of CD Roms for storing at least one of text, audio and visual data are utilized on a local computer having memory. The local computer is in communication with the remote computer and the CD Roms are able to be loaded and operated on the local computer. A mechanism through software is provided on said CD Roms for causing the local computer to communicate with the remote computer and determine if the CD Roms are still up to date, and software on the CD Roms may request the local computer to download information from the remote computer. A mechanism via software on the CD Roms prevents local computer access of particular data on the CD Roms without an unlock code from the remote computer.

3 Claims, 2 Drawing Sheets

TEACHING METHOD AND SYSTEM

This application claims priority under 35 U.S.C. § 119 (e), based upon Provisional Patent Application Ser. No. 60/069,142 filed Dec. 9, 1997.

BACKGROUND OF THE INVENTION

1. Field of the Invention

The present invention relates to a system and method for automated teaching and certification management. More particularly, the invention relates to a compact disk-based (CD Rom) method of teaching students, incorporating a computer network to improve learning performance, controlling the content of lessons, and automatically managing scores and tests on the lesson material.

2. Description of the Related Art

Teaching methods have been developed over time, attempting to improve the learning performance of students. Such methods have taken many forms, including providing various incentives to students for academic improvement.

Further, forms of teaching have been developed for example, journals, teaching systems and methods, and teaching machines. There have been some manufacturing companies that have found it necessary to teach particular students and trainees, such as installers, in-house factory personnel, and potential clients' information regarding the products and services provided by the manufacturing company.

New medias and technologies have been developed for transmitting information to students through the use of computers, but for the most part, particular training and certification programs for industry still necessitate the need for trainers to travel to on-site locations to present information regarding such products and services directly to the trainees.

In other types of situations, students and trainees are sent to education areas for in-house training. Such travel by the student-trainees is expensive, and depending upon their location such travel may be unadvisable or even impossible based on national boundaries, geographic restrictions, or cost of travel.

Additional problems with these types of training are that, it is difficult or nearly impossible to remember all of the material disclosed at such training sessions. Furthermore, this type of training fails to properly address the needs, strength, or time constraining of the student.

SUMMARY OF THE INVENTION

According to the present invention, there is provided an automated system of teaching and lesson management, which requires no classroom teachers. The system eliminates live instructors, while maintaining the quality of educational material by demanding the students or trainees to prove they have mastered and learned the taught material, by demanding such students to pass particular scored tests.

The computerized learning environment includes the use of a local computer with a compact disk player such as a conventional CD Rom Drive, and memory. The local computer is connected to a computer network, through which communication signals (data including text, audio, and visual information) may be sent to and received from a centralized server computer.

The system utilized multiple CD Rom disks or products to "front load" data intensive elements of the training program at the local computer site. Such data intensive elements include, without limitation, audio, video, multimedia, and other types of stored data that require comparatively large amounts of storage or memory space. Through communication through a computer network to another computer called a server, the software located on the CD Rom products, is able to determine the last date to which itself is current, and interrogate the server computer to determine if any updates are available. The local computer may then send a code to the server, instructing the server to check for any updates or additional information. If there are updates and data, the server will send the local computer such electronic updates and data via the communications network. The local computer will save such updates and data to its memory. The local computer through the use of software will determine what CD Rom material has been updated, and utilize only the updated material, not the outdated material, embedded within the CD Rom disks or products.

A key importance of this system is that certain portions of the CD Rom teaching program are not student accessible until successfully passing a computerized test based on previously studied material stored on the CD Rom disk or in the computer memory.

Such computerized testing may be located locally on the local computer after being read from the CD Rom Drive, or more preferably, may be a testing program located on the server or remote computer accessed over the communication network. The educational or teaching materials and data provided by the CD Rom to the local computer may include portions that are not student accessible until the student or trainee has successfully registered the student's or trainee's use or the CD Rom product with the server computer, and successfully passed particular tests.

The answer to such tests may not be located locally, so that it may prevent someone from cheating or skipping important or critical training information needed to be certified on any particular training program.

On a successful test result, either the local computer or the server computer may generate a successful test code, which then would be transmittable via the communication network back either to the local computer system or server computer. The local computer would then utilize the successful test code signal to unlock further additional training modules located on the CD Rom product or unlock other CD Rom products for use. Additionally, by the student or trainee successfully passing a computerized test, the server may update the manufactures certification records for that student or trainee on a computerized data base.

The invention, in one form, includes a teaching system apparatus for improving the ability of a student to learn, with a connection to a remote computer. A plurality of CD Roms for storing at least one of text, audio and visual data are utilized on a local computer having memory. The local computer is in communication with the remote computer and the CD Roms are able to be loaded and operated on the local computer. A mechanism through software is provided on said CD Roms for causing the local computer to communicate with the remote computer and determine if the CD Roms are still up to date, and software on the CD Roms may request the local computer to download information from the remote computer. A mechanism via software on the CD Roms prevents local computer access of particular data on the CD Roms without an unlock code from the remote computer.

The invention, in another form, comprises a method including the steps of providing access to a computer based test on a local computer and providing access to a remote computer having the answers to the computer based test. The method then permits a test taker to answer questions from the computer based test and transmit the answers to the remote computer. The answers from the test taker are compared to the answers of the computer based test in the remote computer. If the transmitted answers are correct to the test answers, the remote computer sends an unlock code from the remote computer to the local computer. Such unlock code may unlock and permit user access to further test questions, or alternatively other teaching modules and materials such as audio, visual and other forms of data.

An advantage of the present invention is that the system creates a high-quality teaching method and system, which prevents students or trainees from accessing new material until the previous material has been learned to an acceptable level, as evidenced by a successful test score.

Another advantage of the present invention is that, through the use of the network updatable materials, tests, and procedures, it is now possible to ensure that the information taught is the most current available.

A further advantage of the invention is that by utilizing a software lockable CD Rom product, it is possible to preposition (i.e., front load) data at the user's computer site; therefore, less data needs to be transmitted through the communication network.

Yet another advantage of the present invention, is that by use of the new teaching method and system, a reduction in the number of instructors, and a reduction in travel and training expenses is created. Additionally, through the use of computer automation, there is the elimination of geographical restrictions, and time schedules for training and testing.

Another advantage of the present invention is that the decreased use of centralized "event-type classroom training" is possible. Such centralized event training is often needed for only one or two individuals, not necessarily for a large group. Waiting until there is a sufficient number to train in a traditional format may be costly in terms of lost productivity.

Still another advantage of the present invention is that the new system provides a low cost education delivery method available 24 hours, seven days a week.

Yet another advantage of the present invention is that the students are given the exact customizable training they need, when they need it.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
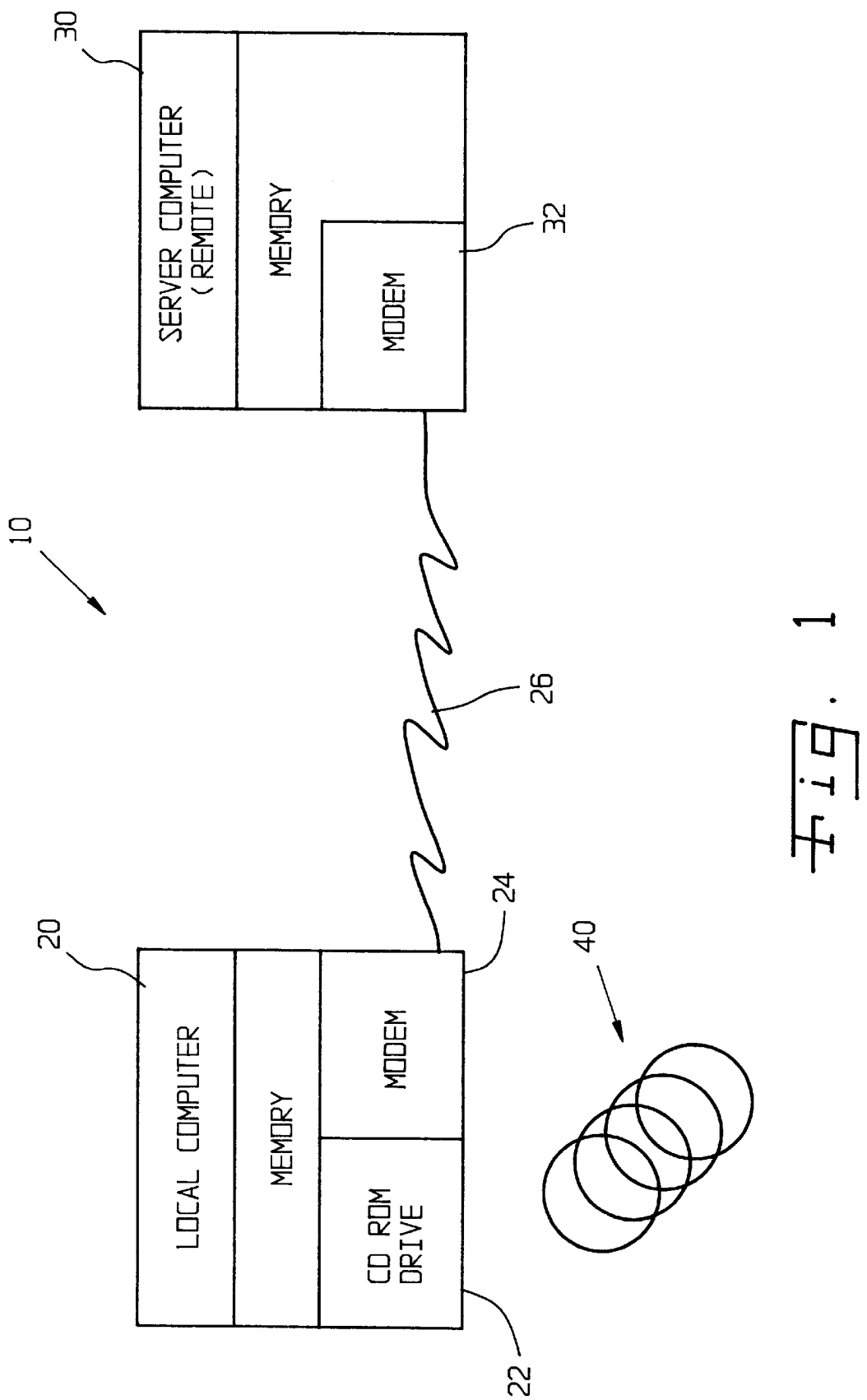
FIG. 1 is a diagrammatic view of the present system.

Referring now to FIG. 1, there is shown a diagrammatic view of the present system 10. System 10 includes a local computer 20 such as an IBM compatible personal computer including a CD Rom Drive 22 and a modem 24. Modem 24 is connected to a communication network 26, such as via telephone communication lines, network communication lines, or other computerized networks such as via the Internet. A server or remote computer 30 located on the other end of communication network 26. Server 30 includes a modem 32 through which communication and data signals may pass back and forth between local computer 20 and server or remote computer 30. CD Rom Drive 22 is able to be loaded with at least one of a plurality of CD Rom disks 40, which store text, audio, visual, and multimedia educational materials of the teaching method. Such CD Rom disks 40 include software application programs for organizing, sequencing and displaying the educational materials.

Figure 2:
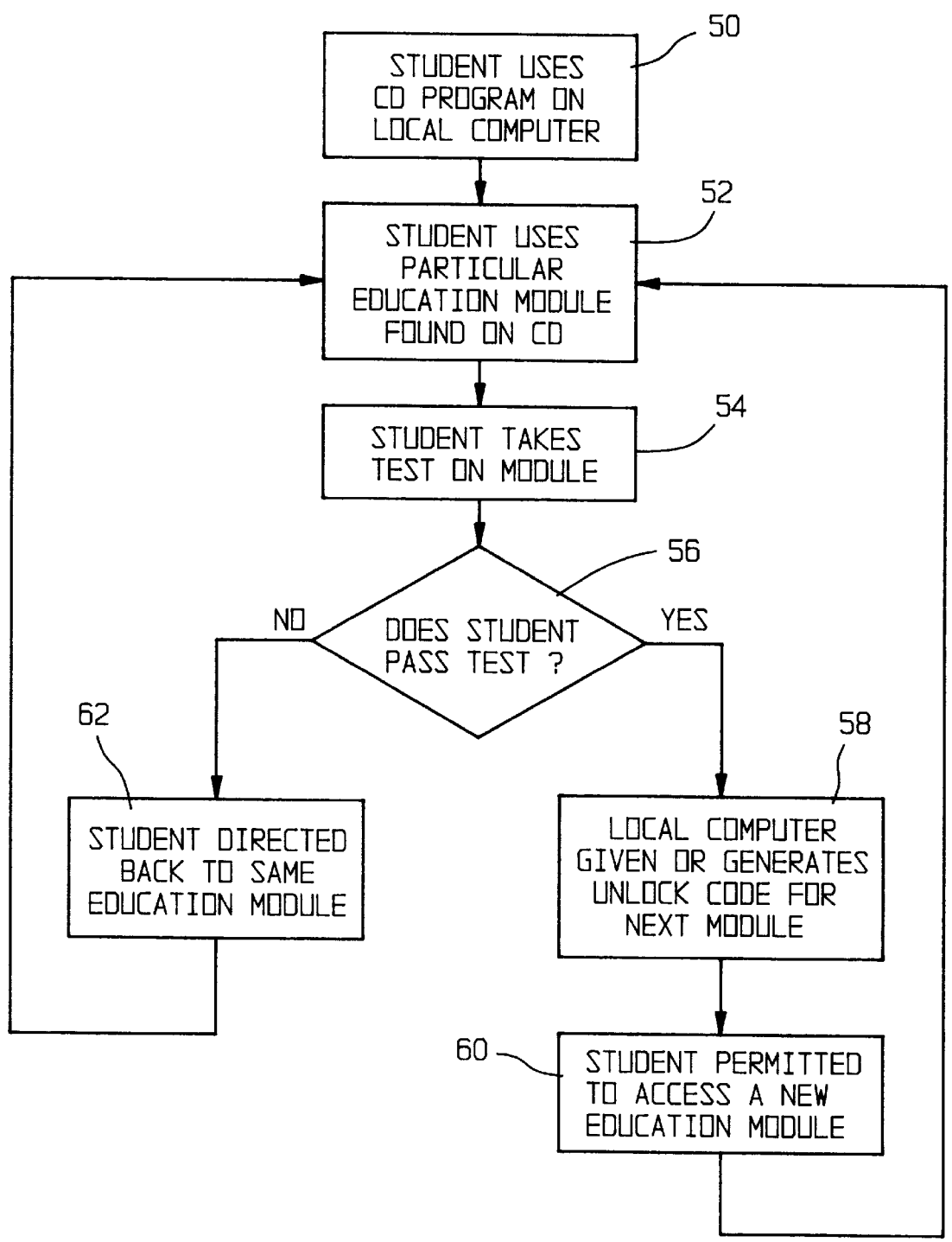
FIG. 2 is a flow chart of the method of the present system.

The method of the present invention, utilizes the multiple CD Rom disks 40 or similar types of high density memory products to front load the data intensive elements of a particular computerized training program at the local computer site. As shown in FIG. 2, student will use these teaching products and software application programs located on such CD Rom products on the local computer in a conventional way (50).

As a student studies particular education module found on the CD Rom product 40, the student will review the material necessary as determined by the manufacturer (52). Either prior to this time, or later, the local system computer 20 will utilize its modem 24, and communicate via communication network 26 to server computer 30 through modem 32. After this connection is created, students will take a test on the particular reviewed material of the module (54). Such computerized electronic tests may be downloaded from server computer 30, or may be located within CD Rom products 40 at the local computer site. Communication through computer network 26, in the preferred embodiment, with server computer 30 will determine whether the student has successfully passed the test taken at the local computer site (56). On a successful test result, preferably the server computer 30 will generate a successful test code signal that will transmitted via communication network 26, back to local computer system 20. Such successful test code signal will permit the software disposed within the CD Rom product or computer memory to unlock another particular education module found on one of the CD Rom products 40 (58).

At this time, the students are permitted to access and review the new education module (60), found on one of the pluralities of CD Rom disks or products 40 or previously loaded into the memory of the local computer.

If the student does not pass the test, the student is directed back to the same education module they had previously studied (62).

The importance of the present system is that particular portions of the CD Rom teaching product or particular CD Roms of the product are not student accessible until the student successfully passes a computer based test.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A teaching system apparatus for improving the ability of a student to learn, with the ability to connect to a remote computer, said apparatus comprising:

a plurality of CD Roms for storing at least one of text, audio and visual data;

a local computer having memory, said local computer in communication with the remote computer, said plurality of CD Roms able to be loaded and operated on said local computer;

means on said CD Roms for causing said local computer to communicate with said remote computer and determine if said CD Roms are still up to date;

means on said CD Roms for requesting said local computer to download information from said remote computer; and means on said CD Roms for preventing local computer access or particular said data on said CD Roms without an unlock code from said remote computer caused to be transmitted to said local computer on successful completion of a knowledge based test.

2. The apparatus of claim 1 in which said downloaded information from said remote computer is an unlock code.

3. The apparatus of claim 1 in which said downloaded information from said remote computer is updated data corresponding to said data stored on said CD Roms.

* * * * *